O. C. SLAUGHTER.
LOCK FOR STEERING MECHANISMS.
APPLICATION FILED OCT. 10, 1919.
1,350,526.
Patented Aug. 24, 1920.
2 SHEETS—SHEET 1.
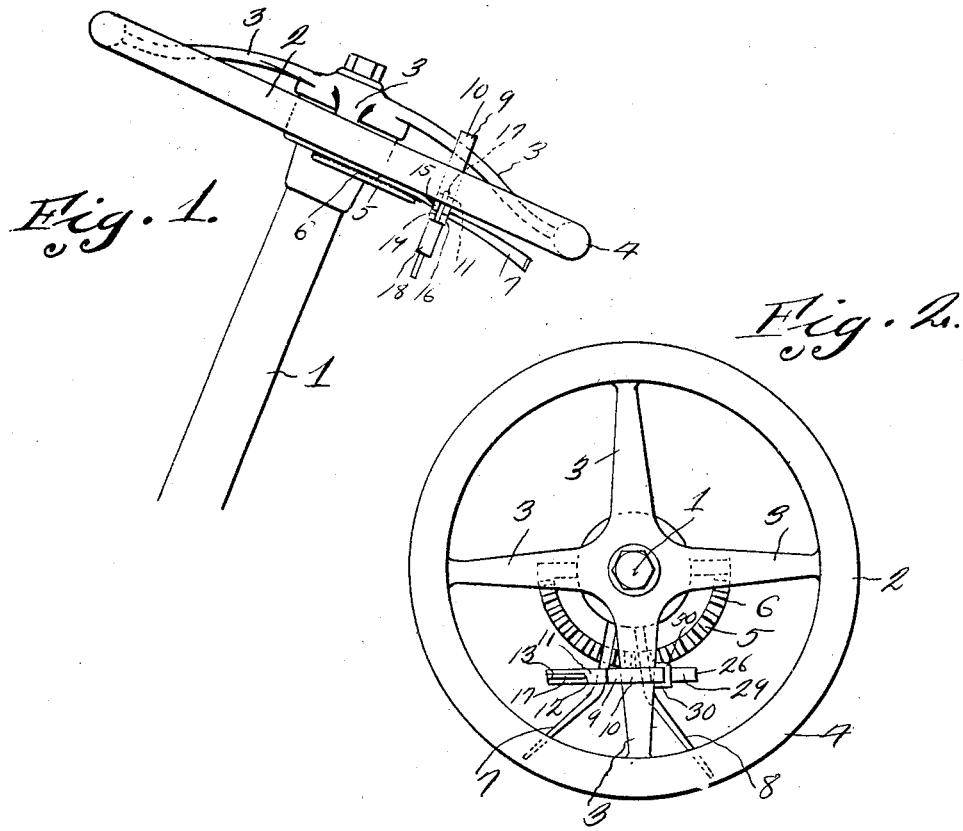
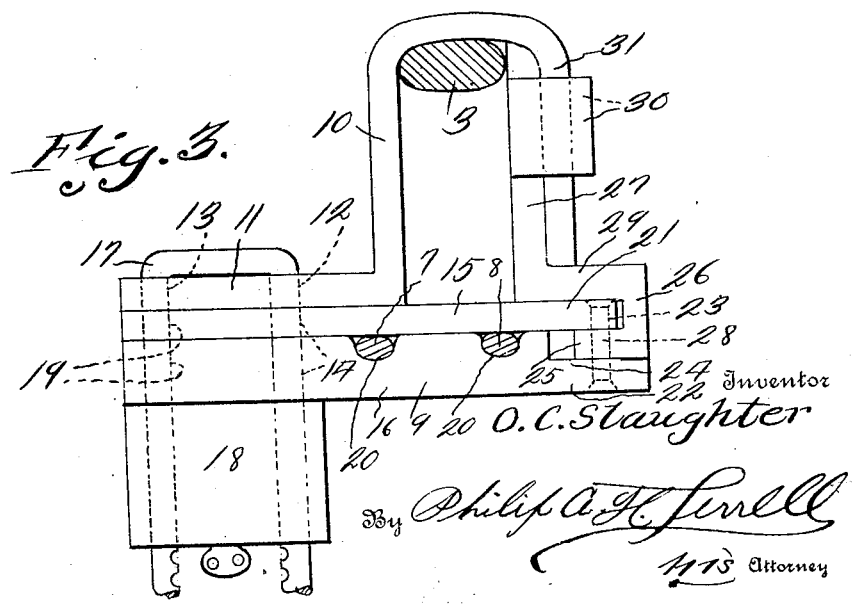
Inventor
O. C. Slaughter
By Philip A. H. Terrell
Attorney

O. C. SLAUGHTER.
LOCK FOR STEERING MECHANISMS.
APPLICATION FILED OCT. 10, 1919.

1,350,526.

Patented Aug. 24, 1920.
2 SHEETS—SHEET 2.

Inventor
O. C. Slaughter

UNITED STATES PATENT OFFICE.

OSCEOLA C. SLAUGHTER, OF OMAHA, NEBRASKA.

LOCK FOR STEERING MECHANISMS.

1,350,526.   Specification of Letters Patent.   Patented Aug. 24, 1920.

Application filed October 10, 1919. Serial No. 329,853.

*To all whom it may concern:*

Be it known that I, OSCEOLA C. SLAUGHTER, a citizen of the United States of America, residing at Omaha, in the county of Douglas and State of Nebraska, have invented certain new and useful Improvements in Locks for Steering Mechanisms, of which the following is a specification, reference being had therein to the accompanying drawing.

The invention relates to steering mechanism locks and has for its object to provide a lock of this character whereby the spark lever, the throttle lever and one of the spokes of the steering wheel may be locked together so that the spark or throttle levers cannot be operated to run the vehicle.

A further object is to provide a lock comprising a member adapted to arch one of the spokes of the steering wheel, said arched member being carried by a horizontal member comprising sections one of said sections having notches for the reception of the spark lever and the throttle lever and locking means between the horizontal members and the member arching the spoke of the steering wheel whereby the wheel and the levers may be securely locked in relation to each other.

With the above and other objects in view the invention resides in the combination and arrangement of parts as hereinafter set forth, shown in the drawing described and claimed, it being understood that changes in the precise embodiment of the invention may be made within the scope of what is claimed without departing from the spirit of the invention.

In the drawings:—

Figure 1 is a side elevation of a steering column and wheel showing the lock applied thereto.

Fig. 2 is a top plan view of the steering wheel showing the lock applied thereto.

Fig. 3 is a front elevation of the lock.

Figure 5:
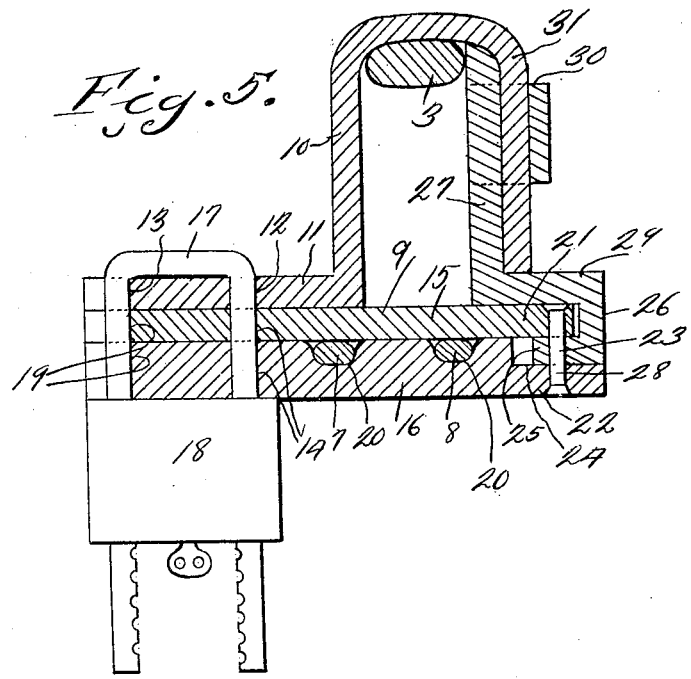
Fig. 5 is a longitudinal sectional view taken on line 5—5 of Fig. 4.
Figure 4:
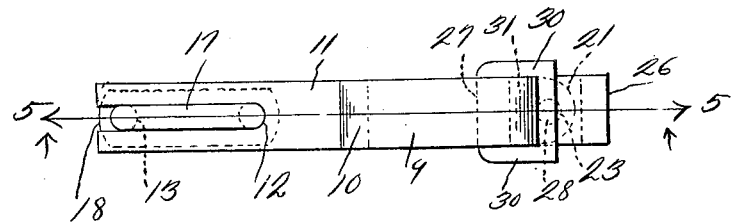
Fig. 4 is a top plan view of the lock.

Referring to the drawings, the numeral 1 designates the steering column on the upper end of which is mounted a steering wheel 2. Steering wheel 2 being provided with a series of spokes 3, the outer ends of which carry the rim 4. The steering column is provided with the usual quadrant 5 over the notched surface 6 of which the spark lever 7 and the throttle lever 8 are adapted to be moved and maintained in different positions to which they have been moved. When it is desired to place the lock 9 in position so as to lock the wheel 2, the spark lever 7 and the throttle lever 8 together, the arched member 10 is passed over the spoke 3 as shown in Fig. 2, said arched member having one of its arms provided with a right angled horizontal arm 11 having an aperture 12 and a notch 13 which are adapted to register with apertures 14 in horizontally disposed lever engaging arms 15 and 16, so that the shackle 17 of a lock 18 will pass through said apertures 12 and 14 and notches 13 and 19, thereby locking the spoke arching member 10 and the arms 15 and 16 securely together. The upper face of the arm 16 is provided with recesses 20 for the reception of the levers 7 and 8, said arms 15 and 16 have their ends 21 and 22 pivoted together as at 23. The upper face of the arm 16 at one end is provided with a notch 24 for the reception of the arms 25 of an arching portion 26 of an upstanding arm 27, said arching portion arching the pin 28 on which the parts pivot so that its horizontal portion 29 will prevent the pin 28 from being driven out. Pin 28 is placed in position by forcing the pin upwardly through the apertures and when the outer end is swaged the inner end will spread by being forced against the horizontal portion 29. This being possible by forming the pin 28 of a comparatively soft metal. The upper end of the upstanding member 27 is provided on its entrance with flanges 30 which overlie the side edges of the downwardly extending arm 31 of the arching member 10, which arches the spoke 3 of the wheel, thereby preventing displacement of the arching member 10 as a whole and at the same time forming a guide for the arm 31. It will be seen that arms 15 and 16 may be pivoted horizontally in relation to each other when the lock is removed so that the levers 7 and 8 may be placed in the notches 20 and that when the lock is removed the arched member 10 may be easily passed over the spoke 3 of the wheel.

From the above it will be seen that a lock for automobile steering wheels is provided, wherein the wheel is securely locked in relation to the spark and throttle levers so that it will be impossible to advance and retard the spark and to operate the throttle lever.

The invention having been set forth what is claimed as new and useful is:—

1. A lock for locking the spark and throttle levers to the steering wheel of an automobile, said lock comprising a U-shaped member adapted to arch one of the spokes of the steering wheel, one arm of said U-shaped member having pivoted thereto a pair of horizontally pivoted members, said members being adapted to receive therebetween the spark and throttle levers and means for locking the free ends of the horizontally pivoted members to the free arm of the U-shaped member.

2. A lock for locking the spark and throttle levers to the steering wheel of an automobile, said lock comprising a U-shaped member adapted to arch one of the spokes of the steering wheel, one arm of the U-shaped member being slidably engaged by an upstanding arm, said upstanding arm being provided with a U-shaped portion horizontally disposed, a horizontal arm pivoted between the sides of the last mentioned U-shaped member, a second horizontal arm pivoted on the lower arm of said last named U-shaped member, notches in the upper face of the last mentioned pivoted arm, and locking means passing through the spoke arching member and the free ends of the horizontally pivoted arms for securely locking the spoke arching member and the horizontally pivoted arms together.

In testimony whereof I hereunto affix my signature.

OSCEOLA C. SLAUGHTER.